(12) United States Patent
Endo

(10) Patent No.: US 7,889,061 B2
(45) Date of Patent: Feb. 15, 2011

(54) POWER-LINE COMMUNICATION DEVICE

(75) Inventor: Satoshi Endo, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1535 days.

(21) Appl. No.: 11/242,288

(22) Filed: Oct. 3, 2005

(65) Prior Publication Data

US 2006/0077046 A1 Apr. 13, 2006

(30) Foreign Application Priority Data

Oct. 6, 2004 (JP) ............................ 2004-293848

(51) Int. Cl.
*G05B 11/01* (2006.01)
(52) U.S. Cl. ............................ 340/310.12; 340/310.14
(58) Field of Classification Search ............ 340/310.11, 340/310.12, 310.13, 310.14; 307/39, 41, 307/63, 86, 139, 137, 132 EA; 333/101, 333/258, 230, 139, 181
See application file for complete search history.

(56) References Cited

U.S. PATENT DOCUMENTS

| | | | | |
|---|---|---|---|---|
| 3,350,637 A | * | 10/1967 | Pochtar ................... 324/76.39 |
| 4,227,178 A | * | 10/1980 | Gergaud et al. ........ 340/825.52 |
| 4,558,354 A | * | 12/1985 | Tanaka ....................... 348/628 |
| 5,033,111 A | * | 7/1991 | Marui .......................... 455/574 |
| 5,144,296 A | * | 9/1992 | DeLuca et al. ............. 340/7.35 |
| 5,303,152 A | * | 4/1994 | Moses et al. .................... 702/4 |
| 5,349,644 A | * | 9/1994 | Massey et al. ................ 706/10 |
| 6,169,341 B1 | * | 1/2001 | Nagai .......................... 307/82 |
| 6,452,820 B2 | * | 9/2002 | Nagai et al. .................... 363/95 |
| 7,040,727 B2 | * | 5/2006 | Ryu et al. ....................... 347/5 |
| 7,243,246 B2 | * | 7/2007 | Allen et al. ................. 713/300 |
| 7,522,430 B2 | * | 4/2009 | Osaka ..................... 363/21.02 |
| 2002/0008979 A1 | * | 1/2002 | Nagai et al. ................... 363/95 |

FOREIGN PATENT DOCUMENTS

| | | |
|---|---|---|
| JP | 2-288515 | 11/1990 |
| JP | 6-284704 | 10/1994 |
| JP | 11-284606 | 10/1999 |
| JP | 2000-165303 | 6/2000 |
| JP | 2000-270471 | 9/2000 |
| JP | 2004-304747 | 10/2004 |

* cited by examiner

*Primary Examiner*—Daniel Wu
*Assistant Examiner*—Rufus Point
(74) *Attorney, Agent, or Firm*—Canon USA Inc IP Div

(57) ABSTRACT

A power-line communication device in which a control signal is superimposed on a power line between a switching power supply and a unit to be controlled to which an output of the switching power supply is supplied, so that the control signal is transmitted to the unit. At the same time, a switching noise generated by the switching power supply is monitored and communication is started by using the switching noise, as a synchronizing signal. Subsequently, communication can be performed during the intervals between the switching noises so that erroneous signal detection is reduced.

11 Claims, 5 Drawing Sheets

POWER-LINE COMMUNICATION DEVICE

BACKGROUND OF THE INVENTION

1. Field of the Invention

The present invention relates to a power-line communication device configured to perform power-line communications, so as to control an electronic apparatus by using a power line connecting a direct-current (DC) power supply configured to supply power for the electronic apparatus and a control circuit.

2. Description of the Related Art

Hitherto, where a copier system includes units that require no high-speed data transfer, serial communication has been used for transferring data and controlling the units. The above-described technology is disclosed, for example, in Japanese Patent Laid-Open No. 11-284606. According to the above-described serial communication, signals transmitted and/or received include a signal indicating that the serial communication is started, a communication clock, transmission data, a latch signal, and so forth so that data can be transmitted with increased reliability.

FIG. 7 schematically shows the known serial communication. Communication is performed between a unit 701 on the control side and a unit 702 to be controlled. Power lines 703 denote five different signal lines including a line S-CS* used for transmitting a signal S-CS indicating that the serial communication has started, a line S-CLK used for transmitting a communication clock S-CLK, a line S-TXDATA used for transmitting transmission data S-TXDATA from the unit 701 to the unit 702, a line S-RXDATA used for transmitting reception data S-RXDATA from the unit 702 to the unit 701, a line S-LC* used for transmitting a data-latch signal S-LC* used for latching the transmission data S-TXDATA.

The number of units of the copier system increases as the functions of the copier system increase. Although data is transmitted by serial communication, the units need to be connected to one another by using communication lines used for transmitting a transmission signal and/or a control signal, which increases the number of signal lines. More specifically, since a single unit requires at least five lines including the communication lines and the control lines, the number of communication lines used for controlling and/or operating the units is obtained by multiplying the number of units by five. Thus, the total number of communication lines increases as the number of units (functions) increases.

As described above, the use of serial communication has become inadequate for reducing the number of signal lines. Namely, it is difficult to ensure space for providing all of the above-described signal lines therein in confined spaces of a cabinet of the copier system. Further, all of communication lines required for transmitting transmission data and control signals must be ensured without reducing the functions of the copier system.

Data communication may be performed by using a cable that is not primarily developed, as a communication line, for example, a power-line cable that is used for supplying power and that is connected between a power supply and a control circuit. In that case, however, a signal may not be correctly transmitted due to noise generated at the time where a switching element of the switching power supply is turned on and/or off.

SUMMARY OF THE INVENTION

The present invention is directed to a power-line communication device with a reduced number of signal lines used for performing communication between at least two units provided in a cabinet of an apparatus.

The present invention is directed to a power-line communication device configured to perform power-line communication between at least two units provided in a cabinet of an apparatus without being affected by a noise.

The present invention is directed to a power-line communication device that is less affected by a switching noise generated by a power supply of an apparatus and that receives less data erroneously than in the past. In one aspect of the present invention, a power-line communication device incorporated in an electronic apparatus, includes: a switching power supply configured to supply electric power by performing ON/OFF control for at least one switching element; a power line; a load unit which receives the electric power transmitted from the switching power supply via the power line; a communication unit provided between the switching power supply and the load unit and communicating with the load unit; a control unit configured to generate a control signal to be transferred to the load unit; and a detection unit which detects a time when the switching power supply generates switching noise and externally transmits a detection signal, wherein the communication unit superimposes the control signal transmitted from the control unit on the power line in synchronization with the detection signal.

Further features of the present invention will become apparent from the following description of exemplary embodiments with reference to the attached drawings and Claims.

DESCRIPTION OF THE EMBODIMENTS

First Embodiment

Hereinafter, embodiments of the present invention will be described in detail with reference to the attached drawings.

Figure 1:
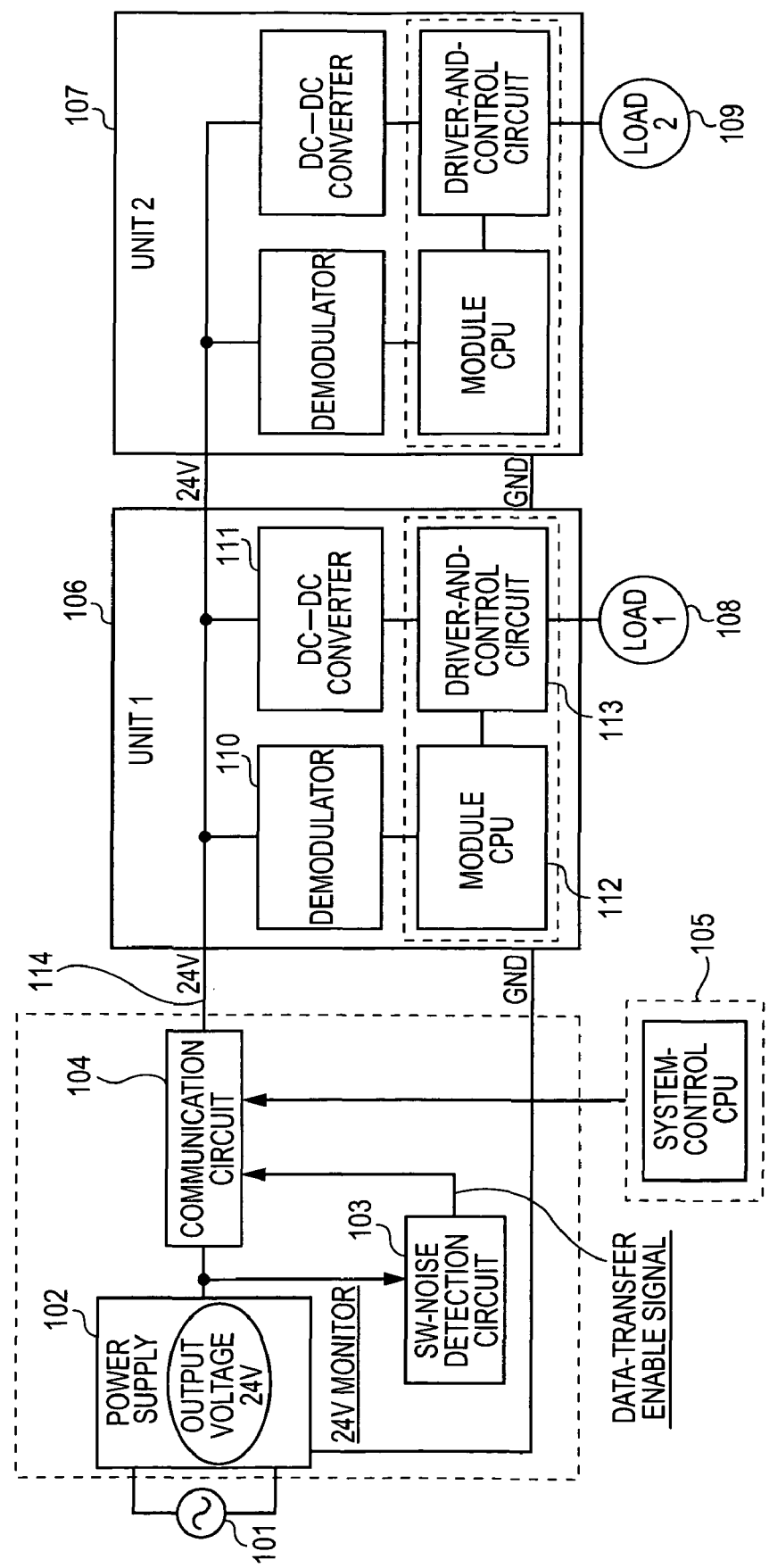
FIG. 1 is a block diagram illustrating the configuration for power-line communication according to a first embodiment of the present invention.

FIG. 1 is a block diagram illustrating a power supply and control units of an image-synthesis apparatus to which the present invention can be used.

AC power of a commercial power supply 101 is transmitted to a power supply 102 so that the image-synthesis apparatus can operate. An output voltage transmitted from the power supply 102 is fixed at about 24 V. The output voltage of the power supply 102 is commonly used, so as to drive first and second loads 108 and 109 such as motors of first and second units 106 and 107 provided in the image-synthesis apparatus, and/or control the units. An output end of the power supply 102 is connected to the units via a power line 114 of 24 V.

Subsequently, the electric power of the power supply 102 is transmitted to the first unit 106 and the second unit 107.

A control signal is superimposed on the power line 114 that connects the power supply 102 to the first and second units 106 and 107, and power-line communication is performed.

A system-control central processing unit (CPU) provided in a main-controller unit 105 generates a control signal used for controlling each of the units and transmits the control signal to a communication circuit 104. The communication circuit 104 is provided at almost the halfway point of the power line 114 connecting the power supply 102 to the first and second units 106 and 107. The communication circuit 104 modulates the control signal so that the frequency of the control signal is changed into a predetermined carrier frequency and superimposes the modulated control signal on the power line 114. The superimposed control signal and the voltage 24 V are transmitted to each of the first and second units 106 and 107. At an input end of each of the first and second units 106 and 107, selection and/or filtering of the carrier frequency are performed. Then, a demodulator 110 demodulates the carrier frequency into the control signal. Thus, the control signal generated by the main controller unit 105 is transmitted to each of the first and second units 106 and 107.

The carrier frequencies transmitted to the first and second units 106 and 107 agree with the frequencies of filters of input ends of the first and second units 106 and 107. It is possible to superimpose a plurality of the control signals on the power line 114, at the same time, where the carrier frequencies transmitted to the first and second units 106 and 107 are different from each other. On the other hand, if the frequencies of the filters of the input ends of the first and second units 106 and 107 are the same as each other, the carrier frequencies of the control signals become equivalent to each other.

The configuration of the first unit 106 will be described. The demodulator 110 and a DC-DC converter 111 are connected to the power line 114 of 24 V. The DC-DC converter 111 includes a voltage converter configured to convert the output voltage 24 V transmitted from the power supply 102 into another DC voltage. The control signal demodulated by the demodulator 110 is transmitted to a module CPU 112 configured to control the first unit 106 and a driver-and-control circuit 113. The driver-and-control signal 113 drives the first load 108, such as a motor, a fan, and so forth of the copier system according to an instruction transmitted from the module CPU 112.

The time where the control signal (transmission data) is superimposed on the power line 114 will be described.

Where the power supply 102 is formed, as a switching power supply, a switching noise is generated at the output end (24 V) of the power supply 102 at the time where a switching element is turned on and/or off. When a control signal is transmitted at the time where the switching noise is generated, the first unit 106 and/or the second unit 107 may not be able to receive the control signal, or may erroneously detect the control signal. Therefore, the control signal needs to be transmitted to the first unit 106 and/or the second unit 107 during the time interval between the switching noises with reliability.

Figure 4:
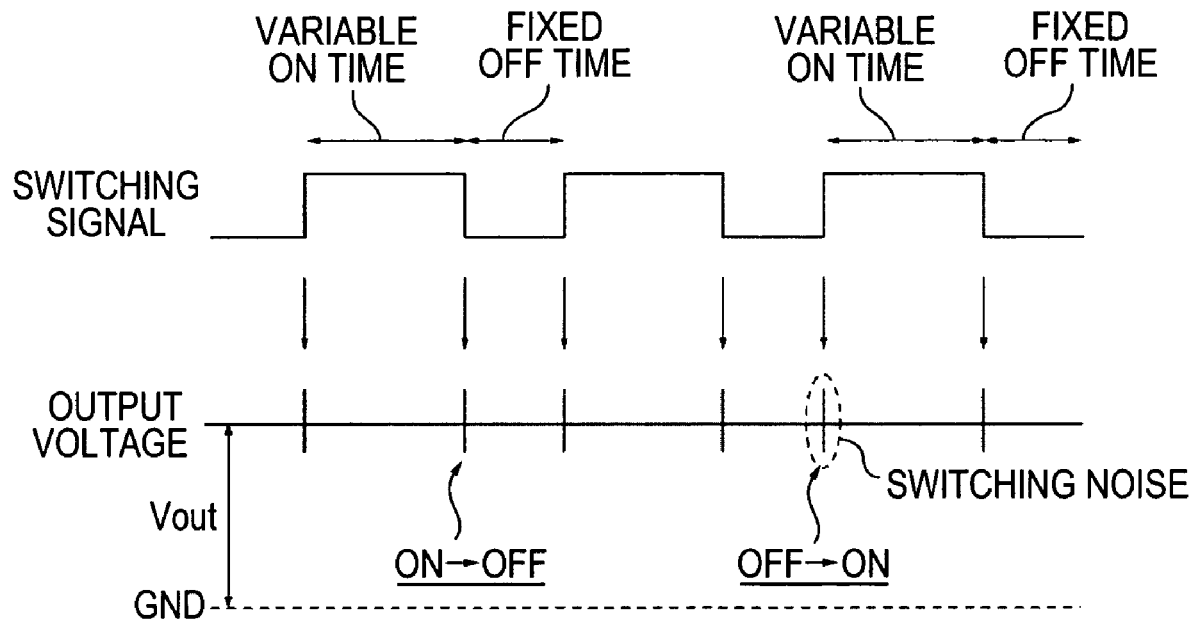
FIG. 4 shows the relationship between a switching signal and the noise of an output voltage.
Figure 5:
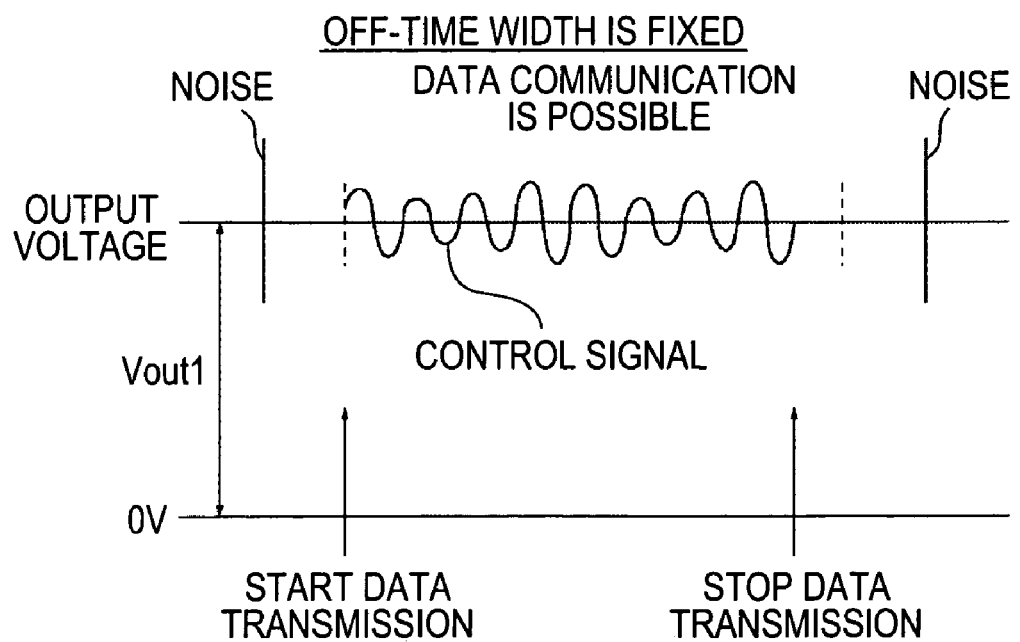
FIG. 5 illustrates the timing of data communication (OFF time).

The relationship between a switching signal used for turning the switching element on and/or off and the noise of an output voltage will be briefly described with reference to FIG. 4. For example, a switching power supply that can change the ON-time width of the switching element performs pulse-width-modulation (PWM) control so that the OFF-time width of the switching element is fixed, the ON-time width is changed, and a target power-output voltage is obtained. Namely, for increasing the output-voltage settings, a switching signal (PWM signal) which increases the ON-time width is generated. For decreasing the output-voltage settings, a switching signal (PWM signal) which decreases the ON-time width is generated. As shown in FIG. 4, the switching noise is generated at the time where the switching signal is switched between the ON state and the OFF state, as is the case with a variable-duty switching power supply configured to perform PWM control which makes the ON-time width and the OFF-time width constant.

A switching (SW) noise detection circuit 103 shown in FIG. 1 monitors an output voltage (24 V) transmitted from the power supply 102 and detects a generated switching noise. The SW-noise detection circuit 103 transmits the SW-noise detection signal to the communication circuit 104, as a synchronizing signal (trigger), that is, a data-transfer enabling signal. Upon receiving the data-transfer enabling signal, the communication circuit 104 modulates a control signal transmitted from the system-control CPU 105 and superimposes the modulated control signal on the power line 114.

In the case where the variable ON-time-width switching power supply is used, it is not very often that the ON-time width changes abruptly. Therefore, it is possible to determine whether or not the amount of modulated control signal can be transmitted during the ON-time period by monitoring the intervals between the data-transfer enabling signals by the communication circuit 104. Namely, the relationship between the data amount and the time required for performing communication is stored in advance in a memory (not shown), as a table. Then, the time intervals between the immediately preceding two data-transfer enabling signals, the amount of data to be transmitted, and the memory table are compared to one another, so as to determine whether or not the amount of the modulated control signal can be transmitted during the ON-time period. If it is determined that the amount of the modulated control signal can be transmitted during the ON-time period, the modulated control signal is superimposed on the power line 114. If not, the modulated control signal is not superimposed on the power line 114 and maintained in the standby state until the ON-time width increases. Otherwise, the communication circuit 104 may transmit a signal, so as to instruct the system-control CPU 105 to divide the control signal.

Thus, a data-transfer synch signal is generated based on the detection of the switching noise on the power line 114, which allows performing power-line communication during the intervals between the switching noises with reliability.

Further, the communication circuit 104 may superimpose the control signal on the power line 114 when the switching element is turned off. In that case, of course, the data amount of the control signal needs to be suitable, so as to be transmitted during the OFF period. Since the length of the fixed OFF period is known in advance, the system-control CPU 105 can generate the control signal corresponding to the length of the OFF period.

Thus, the control signal is superimposed on the power line 114 by a single communication, so as not to be split across the ON period and the OFF period of the switching element. Subsequently, the control signal can be superimposed on the power line 114 without being affected by the switching noise.

According to the first embodiment, the switching noise generated at the output end of the power supply 102 is detected, the data-transfer enabling signal is generated based on the detection result, and transmission data is superimposed on the power line 114 in synchronization with the data-transfer enabling signal. Therefore, the switching is not mixed with the transmission data. Subsequently, data transferred to the first unit 106 and/or the second unit 107 is prevented from being erroneously read thereby. Thus, by performing the power-line communication during the intervals between the switching noises, it becomes possible to provide a highly reliable communication system hardly affected by the switching noise. Further, since the control data is superimposed on the power line 114, the number of the communication lines significantly decreases.

Second Embodiment

Figure 3:
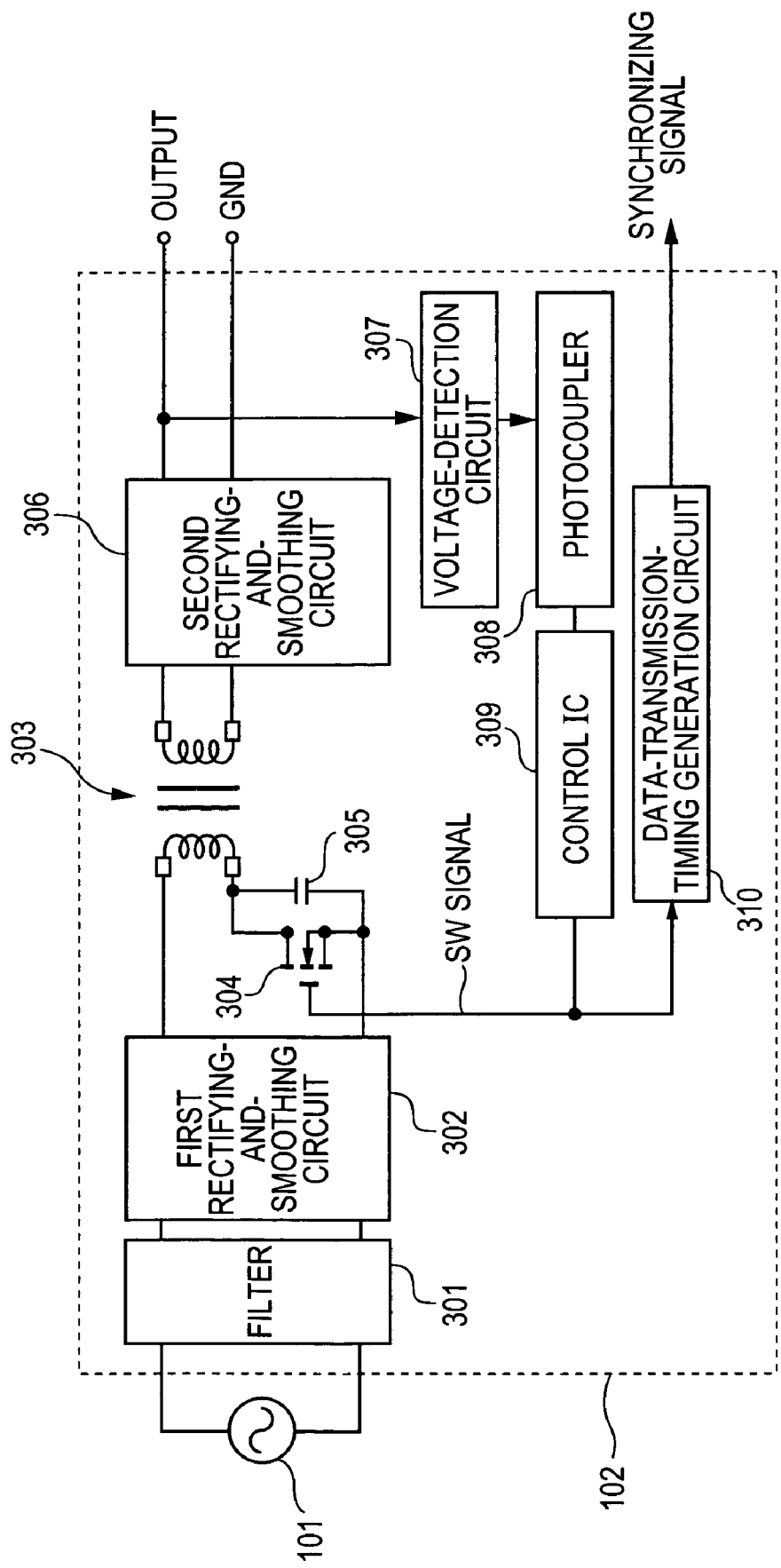
FIG. 3 is a circuit diagram illustrating the configuration of a power-supply unit according to the second embodiment.

The configuration of the power supply 102 (switching power supply) will be described with reference to FIG. 3. Electric power is supplied from the commercial power supply 101 to the power supply 102. The electric power is transmitted to a first rectifying-and-smoothing circuit 302 via a filter 301 and converted into a DC voltage. The DC voltage is transmitted to one end of a primary winding of an insulating transformer 303. A resonant capacitor 305 and a switching (SW) element 304 are connected to the other end of the primary winding. When the SW signal is switched between the ON state and the OFF state, the switching element 304 is driven and an output voltage is generated at a secondary winding of the insulating transformer 303. The output voltage is rectified and smoothed into a DC voltage by a second rectifying-and-smoothing circuit 306 and externally transmitted from the power supply 102. For controlling the output voltage of the power supply 102, so as to be adjusted into a predetermined voltage (24 V), a voltage-detection circuit 307 detects the output voltage. The voltage of the voltage-detection circuit 307 is fed back to the primary side via a photocoupler 308. The photocoupler 308 is provided, so as to insulate the secondary-side circuit and the primary-side circuit of the insulating transformer 303 from each other. The voltage fed back to the primary side is transmitted to a control integrated circuit (IC) 309 configured to control the SW element 304. The control IC 309 generates the switching signal SW (PWM signal) corresponding to the fed-back voltage and transmits the switching signal SW to the SW element 304. Subsequently, the output of the power supply 102 is maintained at the predetermined voltage.

The switching signal SW generated by the control IC 309 is also transmitted to a data-transfer-timing generation circuit 310. The data-transfer-timing generation circuit 310 detects the time when the switching signal SW rises and/or falls, generates the synch signal corresponding to the time, and transmits the synch signal to a predetermined device outside the power supply 102.

Figure 2:
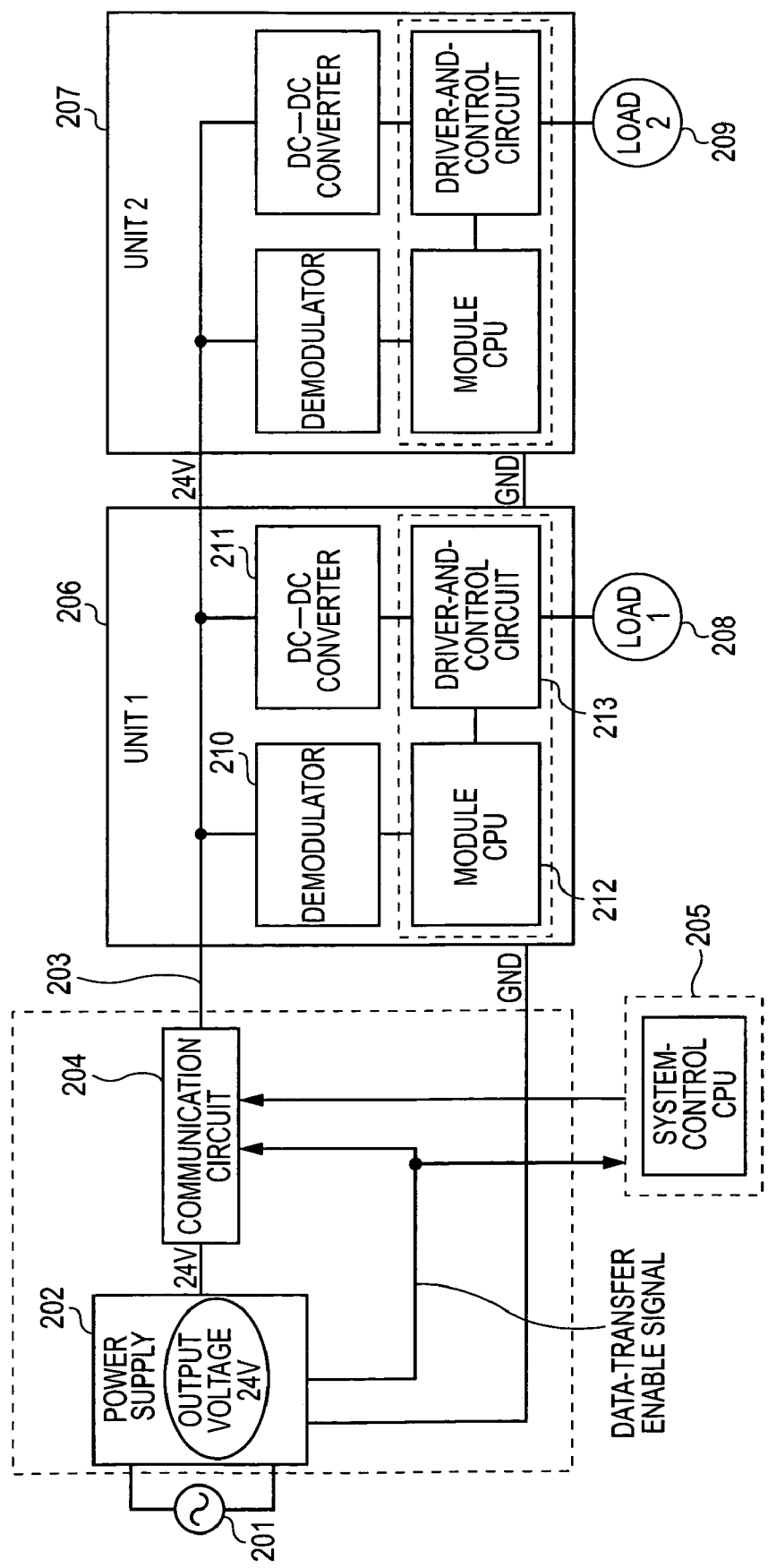
FIG. 2 is a block diagram illustrating the configuration for power-line communication according to a second embodiment of the present invention.

FIG. 2 is a block diagram that shows the configuration of an image-synthesis apparatus according to a second embodiment of the present invention with emphasis on power-line communications.

A synch signal transmitted from a power supply 202 is transmitted to a communication circuit 204 and a main controller 205, as a data-transfer enable signal. The main controller 205 monitors the data-transfer enabling signal. A system-control CPU provided in the main controller 205 generates a control signal used for driving each of first and second units 206 and 207. The main controller 205 detects that the data-transfer enabling signal monitored thereby enters the ON state, and transmits the control signal used for driving each of the first and second units 206 and 207 to the communication circuit 204.

The communication circuit 204 modulates the transmitted control signal used for driving each of the first and second units 206 and 207, so as to obtain a carrier wave that agrees with the frequency of each of demodulators 210 of the first and second units 206 and 207. Then, the modulated control signal (transmission data) is superimposed on a power line 203 by using the data-transfer enabling signal of the power supply 202, as a synch signal.

The signal transmitted to the first unit 206 is demodulated by the demodulator 210, and converted into the control signal. A DC-DC converter 211 converts a voltage (24 V) transmitted to the first unit 206 via the power line 203 into a voltage used for driving a first load 208, and transmits the converted voltage to a driver-and-control circuit 213. A module CPU 212 controls the driver-and-control circuit 213 based on the control signal transmitted from the demodulator 210 and drives the first load 208. The configuration of the second unit 207 is the same as that of the first unit 206, and the second unit 207 drives a second load 209 based on a control signal transmitted from the main controller 205.

A method for transferring data by differentiating between the ON time and the OFF time of a switching signal (PWM signal) of the power supply 202 will be described. As has been described, switching power supply 202 keeps the OFF-time width of the switching signal constant, changes the ON-time width of the switching signal, and performs the PWM control corresponding to an output voltage, so as to externally transmit a predetermined voltage. Subsequently, it becomes possible to predict the end of the OFF time of the switching signal, that is, the time when the switching signal enters the ON-time period, which allows performing power-line communications for a predetermined amount of data that can be transmitted during the OFF-time period.

Figure 6:
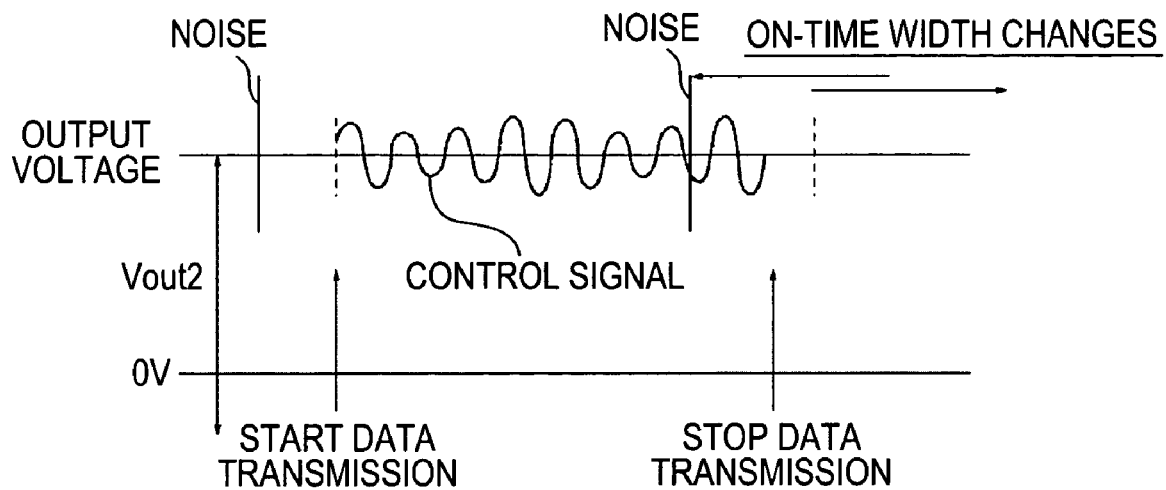
FIG. 6 illustrates the timing of data communication (ON time).
Figure 7:
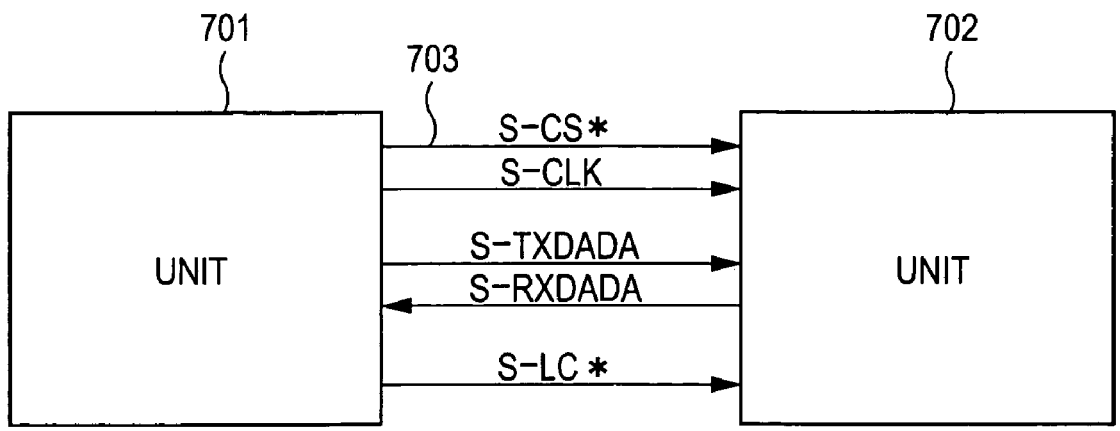
FIG. 7 illustrates a known communication method.

The ON-time width changes according to the magnitude of an output voltage, as shown in FIG. 6. Therefore, where the output voltage of the power supply 202 is lower than a target voltage and the switching signal is changed from the ON-time period to the OFF-time period during data transfer by the power-line communication, a switching noise may be mixed with the transfer data at the time when the switching signal is changed so that the first unit 206 and/or the second unit 207 may erroneously read the transfer data. For starting the power-line communication during the switching signal in the ON-time period, the communication circuit 204 and/or the CPU 205 checks whether or not a predetermined voltage is obtained, where the predetermined voltage can secure an ON-time width that is wide enough to keep switching noise from being mixed with the transfer data. After that, the control signal (transfer data) may be transferred by the power-line communication.

The communication circuit 204 determines the time when the power-line communication should be performed by referring to a memory (not shown) storing data indicating the relationship between the amount of data to be transferred, a predetermined voltage of the power circuit, and the ON-time period.

According to the second embodiment, a data-transfer enabling signal is generated from a switching signal in a power-supply unit, and transfer data is superimposed on a power line in synchronization with the data-transfer enabling signal. Subsequently, no switching noise is mixed with the transfer data during the data transferred, and the transferred data is prevented from being erroneously read by the first unit and/or the second unit. Further, over a time period when the output voltage of the power supply changes, the ON-time period of the switching signal includes at least one time period when the power-line communication cannot be finished. Therefore, when the output voltage is equivalent to or lower than the predetermined voltage, the power-line communication is not performed during the ON-time period.

Accordingly, it becomes possible to perform power-line communication during the intervals between the switching noises and provide a highly reliable communication system hardly affected by the switching noise. Further, since the control data is superimposed on the power line, the number of communication lines significantly decreases.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2004-293848 filed Oct. 6, 2004, which is hereby incorporated by reference herein in its entirety.

What is claimed is:

1. A power-line communication device, comprising:
a switching power supply including a DC voltage generating circuit, a transformer in which one end of a primary winding of the transformer is connected to the DC voltage generating circuit, a switching element connected between another end of the primary winding and the DC voltage generating circuit, and a rectifying-and-smoothing circuit connected to a secondary winding of the transformer;
a communication unit provided on a power line connecting a unit to which power is supplied from the switching power supply;
a control unit that generates a control signal to be transmitted to the unit; and
a switching noise detection unit that monitors an output from the switching power supply, detects a switching noise present in the output from the switching power supply,
wherein the communication unit superimposes the control signal on the power line in synchronization with the switching noise detected by the switching detection unit such that the control signal does not cross a boundary between an ON period and an OFF period of the switching power supply.

2. A power-line communication device, comprising:
a switching power supply including a DC voltage generating circuit, a transformer in which one end of a primary winding of the transformer is connected to the DC voltage generating circuit, a switching element connected between another end of the primary winding and the DC voltage generating circuit, and a rectifying-and-smoothing circuit connected to a secondary winding of the transformer;
a communication unit provided on a power line connecting a unit to which power is supplied from the switching power supply; and
a control unit that generates a control signal to be transmitted to the unit,
wherein the communication unit superimposes the control signal on the power line in synchronization with a switching signal used to drive the switching element in the switching power supply such that the control signal does not cross a boundary between an ON period and an OFF period of the switching power supply.

3. The power-line communication device according to claim 1, wherein the switching power supply is a switching power supply that is controlled by using a variable ON period width and a fixed OFF period width.

4. The power-line communication device according to claim 3, wherein in a case in which a set voltage of the switching power supply is equivalent to or higher than a predetermined value, the communication unit superimposes the control signal on the power line during the ON period.

5. The power-line communication device according to claim 2, wherein the switching power supply is a switching power supply that is controlled by using a variable ON period width and a fixed OFF period width.

6. The power-line communication device according to claim 5, wherein in a case in which a set voltage of the switching power supply is equivalent to or higher than a predetermined value, the communication unit superimposes the control signal on the power line during the ON period.

7. A power-line communication device, comprising:
a switching power supply including a DC voltage generating circuit, a transformer in which one end of a primary winding of the transformer is connected to the DC voltage generating circuit, a switching element connected between another end of the primary winding and the DC voltage generating circuit, and a rectifying-and-smoothing circuit connected to a secondary winding of the transformer;
a unit to be controlled, to which an output from the switching power supply is supplied via a power line;
a control unit that generates a control signal used to control the unit; and
a transmission unit that superimposes the control signal generated by the control unit on the power line and sends the control signal to the unit during an ON period or during an OFF period of the switching element in the switching power supply such that the control signal does not cross a boundary between the ON period and the OFF period of the switching power supply.

8. The power-line communication device according to one of claims 1, wherein the switching power supply and the unit or units are provided in a same apparatus.

9. The power-line communication device according to one of claims 2, wherein the switching power supply and the unit or units are provided in a same apparatus.

10. The power-line communication device according to one of claims 7, wherein the switching power supply and the unit or units are provided in a same apparatus.

11. The power-line communication device according to claim 8, wherein the same apparatus is an image forming apparatus.

* * * * *